United States Patent
Fouqueray et al.

(10) Patent No.: US 8,695,173 B2
(45) Date of Patent: Apr. 15, 2014

(54) CLAMPING COLLAR

(75) Inventors: Cyriaque Fouqueray, Romorantin (FR); Adrien Sassier, Chouzy sur Cisse (FR); Christophe Lache, Romorantin (FR)

(73) Assignee: Etablissements Caillau, Issy-les-Moulineaux (FR)

( * ) Notice: Subject to any disclaimer, the term of this patent is extended or adjusted under 35 U.S.C. 154(b) by 0 days.

(21) Appl. No.: 13/497,326

(22) PCT Filed: Aug. 30, 2010

(86) PCT No.: PCT/FR2010/051798
§ 371 (c)(1), (2), (4) Date: Mar. 21, 2012

(87) PCT Pub. No.: WO2011/036364
PCT Pub. Date: Mar. 31, 2011

(65) Prior Publication Data
US 2012/0174343 A1    Jul. 12, 2012

(30) Foreign Application Priority Data
Sep. 24, 2009 (FR) .................... 09 56601

(51) Int. Cl.
*F16L 33/035* (2006.01)
*F16B 2/08* (2006.01)

(52) U.S. Cl.
USPC .................... 24/20 EE; 24/20 TT

(58) Field of Classification Search
USPC ............. 24/20 R, 20 CW, 20 EE, 20 TT
See application file for complete search history.

(56) References Cited

U.S. PATENT DOCUMENTS

| 3,266,109 A * | 8/1966 | Thomas ............ 24/20 R |
| 4,924,558 A | 5/1990 | Calmettes et al. |
| 5,530,996 A | 7/1996 | Calmettes et al. |
| 2004/0025305 A1 | 2/2004 | Sidaine et al. |

FOREIGN PATENT DOCUMENTS

| EP | 0 344 050 | 11/1989 |
| FR | 2 705 411 | 11/1994 |
| WO | WO02/50468 | 6/2002 |

* cited by examiner

*Primary Examiner* — Robert J Sandy
*Assistant Examiner* — Michael Lee
(74) *Attorney, Agent, or Firm* — Hamre, Schumann, Mueller & Larson, P.C.

(57) ABSTRACT

The collar comprises a metal belt (10) having a projecting lug (18) in the vicinity of a first end (10A), and a hook (14) in the vicinity of a second end (10B), which hook has a front wall (15) designed to be retained against a rear wall (19) of the lug (18) while the hook (14) is hooked onto the lug (18) in order to maintain the collar in the tightened state. Seen from above, the rear wall (19) of the lug (18) has a V-shape having its tip (19A) pointing (S) away from the hook (14), and the front wall (15) of the hook (14) has hooking sides (15B) that are inclined relative to the transverse direction of the belt to match the inclination of the branches (19B) of the V-shape.

13 Claims, 3 Drawing Sheets

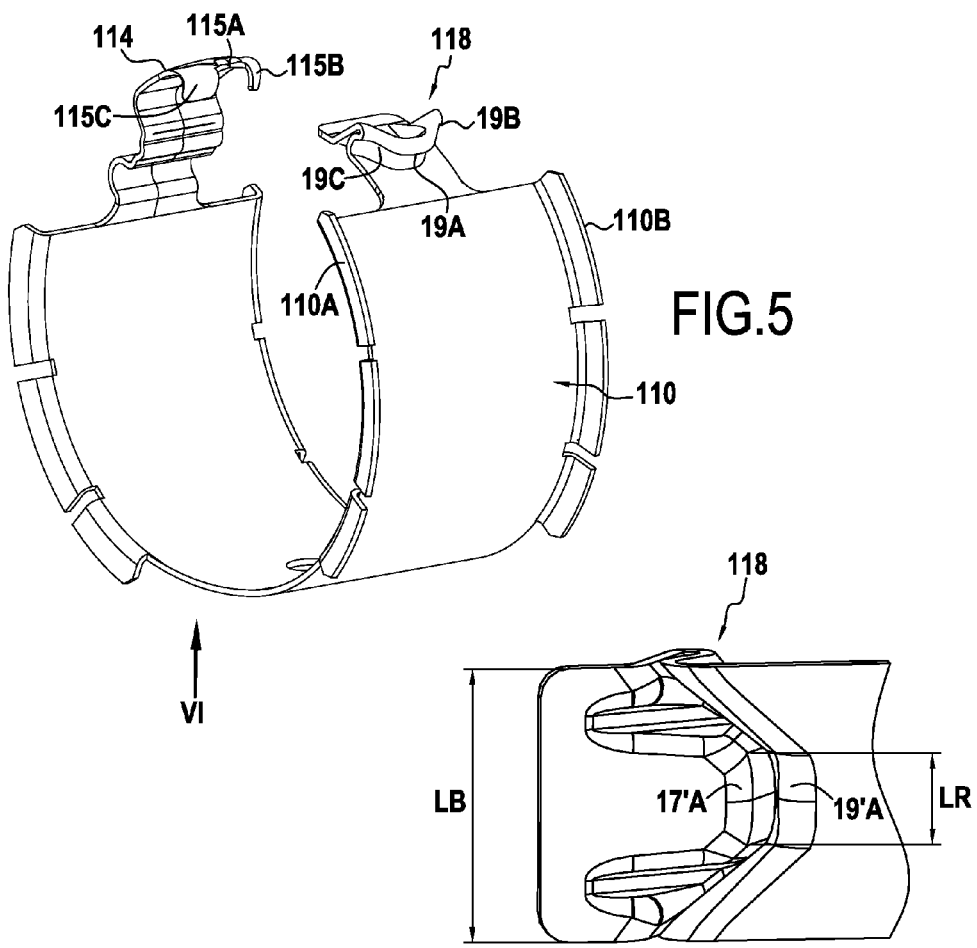
FIG.5
FIG.7
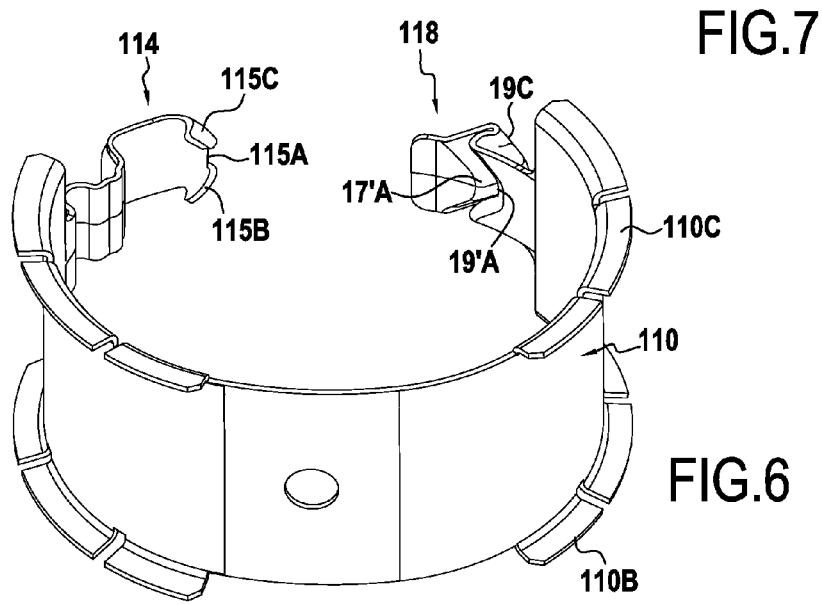
FIG.6

CLAMPING COLLAR

The present invention relates to a clamping collar comprising a metal belt having a projecting lug in the vicinity of a first end, and a hook in the vicinity of a second end, which hook has a front wall designed to be retained against a rear wall of the lug while the hook is hooked onto the lug in order to maintain the collar in the tightened state.

Clamping collars of this type are already known, e.g. by Patent Application EP 0 003 192. In that known prior art, the lug is formed by a radial double fold, each layer of said double fold being oriented transversely to the length of the metal belt, i.e. along the axis of the collar.

In an improved version of such prior art collars, e.g. as in Patent Applications FR 2 705 411 and EP 0 724 106, the rear layer of the double fold has a centering projection that projects from the rear wall of the lug. The hook then has a suitable configuration with its front wall shaped so that it can be wedged axially relative to said projection. In particular, in the prior art, the front wall of the hook is provided with a notch in which the projection comes to be inserted. This makes it possible to center the lug and the hook relative to each other, by aligning them along the longitudinal axis of the belt.

In order to avoid any confusion, it is specified that the term "axis of the collar" is used herein to mean the axis passing through the center of the belt and of the collar, and extending over the width of the belt. Conversely, the term "longitudinal axis of the belt" is used herein to mean the axis that, when the belt is laid out flat prior to being looped on itself, extends along the length of said belt, perpendicularly to the width thereof. Once the belt is looped on itself, the longitudinal axis of the belt forms a circle that is centered relative to the width of the belt.

Such prior art collars are satisfactory, in particular those that enable the hook and the lug to be centered relative to each other. In order to close and tighten the collar, the hook passes over the lug, and the front wall of the hook comes to hook onto the rear wall of the lug. The front wall of the lug thus forms a sort of ramp, on which the edge of the front wall of the hook comes to slide, so that the hook can pass over said lug. However, in the above-mentioned prior art collars, even those that are improved to enable the hook and the lug to be centered relative to each other, such a ramp does not make it possible to guide the hook effectively with a view to centering it. Thus, if the edge of the front wall of the hook reaches the top of the lug significantly off-center relative to the centering projection, the hooking might not take place properly.

An object of the invention is to improve the prior art further, by proposing a clamping collar f the type mentioned in the introduction and that has an improved lug.

This object achieved by means of the fact that, seer from above, the rear wall of the lug has a V-shape having its tip pointing away from the hook, and the front wall of the hook has hooking sides that are inclined relative to the transverse direction of the belt to match the inclination of the branches of the V-shape.

Seen from above, the tip of the V-shape formed by the rear wail of the lug may be "blunt" without really forming a pointed tip, but rather forming a rounded tip. In any event, this lug is very specific in that, on either side of this tip, the lug has two inclined branches forming a V-shaped configuration. Thus, while it is passing over the top of the lug, even if the edge of the front wall of the hook is shifted off-center, said edge co-operates preferentially with one of the branches of the V-shape that, by being inclined, tends naturally to re-direct the edge of the front wall of the hook in such a manner as to re-center it relative to the lug. In addition, the distribution of the tightening forces is thus improved. Once the collar is tightened, said tightening forces are exerted in particular on the hooking sides of the front wall of the hook, which wall co-operates with the branches of the V-shape that is formed by the rear wall of the lug. Since said hooking sides and said branches are inclined, the tightening forces are essentially reduced to a single component that is centered on the longitudinal axis of the belt. This improves the strength of the tightening and prevents any risk of untimely unhooking by the hook and the lug moving transversely relative to each other in uncontrolled manner.

Advantageously, the lug is formed by a double fold, and, seen from above, the front portion of the double fold, i.e. the portion that forms the front wall of the lug, also has a V-shape having its tip pointing away from the hook.

The fact that the front wall of the double fold formed by the lug is also V-shaped makes it possible to achieve a further improvement in the relative centering of the hook and of the lug. As indicated above, during closure of the collar, this front wall acts as a ramp with which the edge of the front wall of the hook co-operates. By means of its V-shape, the front wall of the lug forms a guide that co-operates with the edge of the front wall of the hook, in particular with the edges of the inclined hooking sides of said front wall, so as to center the hook properly relative to the lug while the hook is rising up said ramp. The hock thus reaches the top of the lug while being fully centered, and the hooking takes place in fully safe manner.

Advantageously, the front wall of the lug has stiffener ribs. Preferably, said ribs are disposed symmetrically about the tip of the V-shape formed by said front wall, in such a manner as to avoid adversely affecting the above-mentioned guidance.

Advantageously, in the recess of the V-shape, a central fraction of the base of the front portion of the double fold that forms the lug is pushed away in the plane of the belt, under said front portion.

In prior art collars in which the rear wail of the lug has a centering projection, the clamping may be locally deficient under said projection. Conversely, with this characteristic of the invention, the metal material is pushed away under the front portion of the double fold that is formed by lug, and thus comes to procure bearing continuity of the metal material against the article that is being clamped by means of the collar, even in the region of the centering projection formed by the tip of the V-shape that is formed by the rear wall of the lug.

Advantageously, the front wall of the hook is provided with a central setback.

This central setback may, in particular, be formed by a notch formed in the front wall of the hook, which notch receives the tip of the V-shape of the rear wall of the lug in the hooked and tightened state of the collar.

However, advantageously, the front wall of the hook has a central fraction that is set forward going from the head of the hook towards the set-forward edge of said central fraction, and two side fractions that are set back relative to said central fraction. Thus, without a notch being provided in the front wall of the hook, it is the set-forward central fraction that co-operates with the tip of the V-shape of the rear wall of the lug, while coming to fit over said tip by means of the collar being in the hooked and tightened state. As a result, the tightening forces are exerted over the entire width of the front wall of the hook, and are thus better distributed than when said front wall is provided with a notch.

The invention can be well understood and its advantages appear more clearly on reading the following detailed description of an embodiment shown by way of non-limiting example. The description refers to the accompanying drawings, in which:

FIG. 5 is a perspective view of the collar, seen looking along arrow V of FIG. 4A;

FIG. 6 is a perspective view of the collar, seen looking along arrow VI of FIG. 5, and therefore showing the inside faces of the hook and of the lug; and FIG. 7 is an under view of the lug, seen from below.

Figure 1:
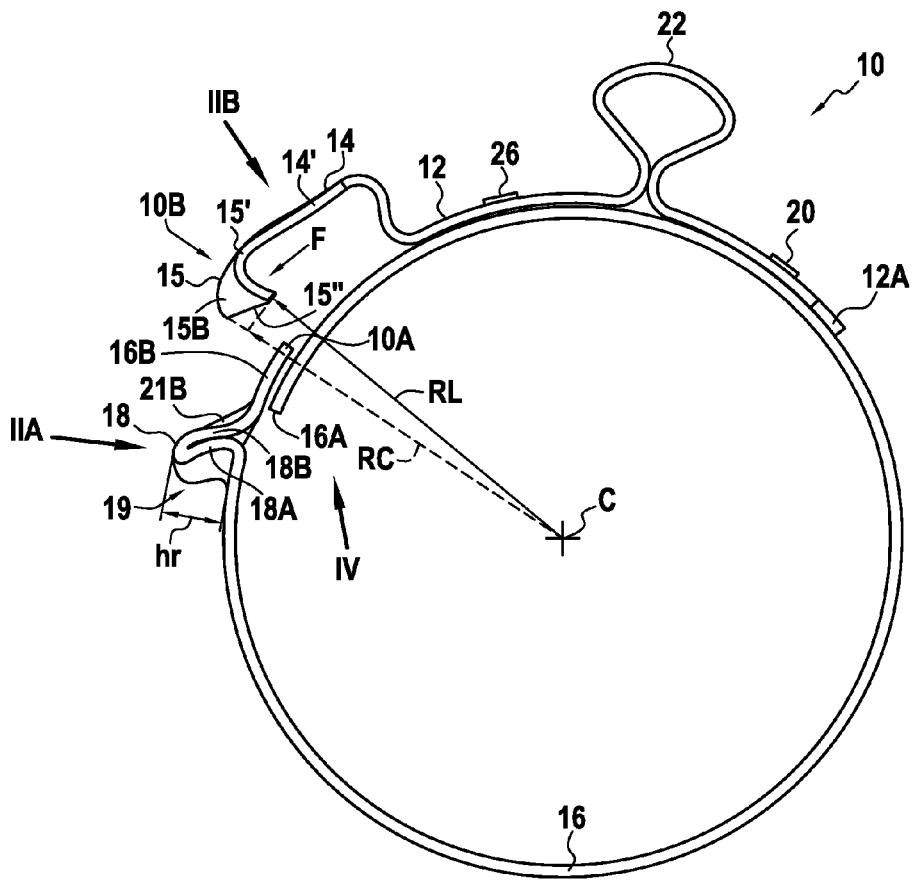
FIG. 1 is a side view of a first variant of a collar of the invention.

The collar shown in FIG. 1 comprises a metal belt 10 made up of two strip fractions, namely a first strip fraction 12 that carries a hook 14, and a second strip fraction 16 that carries a lug 18. The lug 18 is formed in the vicinity of the free end of the second strip fraction 16 that forms a first end 10A of the belt. The hook 14 is formed at one end of the first strip fraction 12 that forms a second end 10B of the belt. The end 16A of the second strip fraction 16 that is opposite from the end 10A comes back under the hook 14, said second strip fraction 16 being looped back over more than 360°, so as to form a tongue providing bearing continuity under the hook 14.

The end 12A of the first strip fraction 12 that is opposite from the hook 14 is fastened to the second strip fraction 16 by any suitable means, e.g. by a rivet 20. Between said end 12A and the hook 14, the first strip fraction 12 is provided with a reserve of elasticity 22 and with a window 24 (see FIG. 2B) through which a stud 26 projects that is formed in the first strip fraction 16.

It can be understood that, in order to close and tighten the collar, the front wall 15 of the hook 14 passes over the lug 18, and said front wall comes to hook over the rear wall 19 of the lug 18, while being retained against said rear wall.

In the meaning of the present description, a portion of the hook described as being in "front" of some other portion is a portion that is closer to the lug than the other portion, which is thus to the "rear" of or "behind" the front portion. Similarly, a portion of the lug that is described as being in "front" of some other portion, is closer to the hook than the other portion.

Figure 2A:
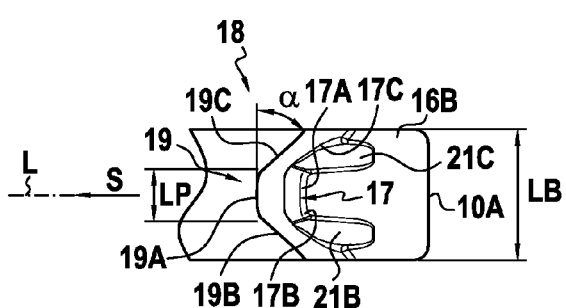
FIG. 2A is a plan view, seen from above looking along arrow IIA of FIG. 1, showing the lug.

It can be seen in FIG. 2A that, seen from above, the rear wall 19 has a V-shape, the tip 19A of which is pointing away from the hook 14 as indicated by arrow S. This arrow S also indicates the way in which the hook is moved relative to the lug in order to hook its front wall 15 behind the lug 18. The tip 19A of the V that the rear wall of the hook forms is blunt, i.e. slightly rounded or having a flat, as shown, so that said tip extends over a width LP that represents approximately in the range ¼ of the total width LB of the strip fraction in which the lug 18 is formed to ⅓ of said total width LB. On either side of said tip, the V-shaped rear wall of the lug 18 has two side branches, respectively 19B and 19C, which are inclined symmetrically relative to the longitudinal axis L of the strip fraction in question.

Figure 2B:
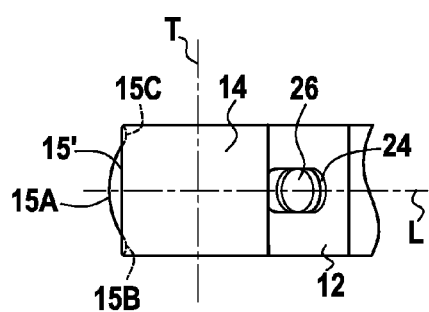
FIG. 2B is a plan view, seen from above looking along arrow IIB of FIG. 1, showing the hook.

As can be seen in FIG. 2B, the front wall 15 of the hook has hooking sides, respectively 15B and 15C, which are inclined relative to the transverse direction T of the belt (this direction corresponding to the direction of the axis of the collar), to match the inclination of the branches 19B, 19C of the V-shape formed by the rear portion of the lug, relative to said transverse direction T. In this example, the front wall 15 has a central fraction 15A that is set forward, and side fractions 15B and 15C that are set back relative to said central fraction. With reference to FIGS. 1 and 2B, it can be understood that said central fraction 15A of the front wall 15 projects forwards going from the head 15' of the hook towards the edge 15" of said hook. In the central fraction 15A, said edge 15" is set forward. The head 15' of the hook 14 corresponds to the front limit of its top wan 14', at which the folding takes place that shapes the front wall of the hook in such manner that said wall extends substantially radially so as to be capable of hooking behind the lug 18. It can be understood that, in the hooked state, the set-forward central fraction 15A fits over the tip 19A of the V-shape formed by the rear wall 19 of the lug 18.

As can be seen clearly in FIG. 1, the lug 18 formed by a double fold having two fold layers, respectively a rear fold 18A and a front fold 18B. The front wall 17 of the lug is formed on a front portion of the double fold. It can be seen in FIG. 2A that, seen from above, the wall 17 also has a V-shape, the tip 17A of which is pointing as indicated by arrow S. On either side of said tip, said front wall has two inclined branches, respectively 17B and 17C. It can be seen that the V-shapes 19A, 19B, and 19C of the rear wall and 17A, 17B, and 17C of the front wall are parallel. While the collar is being tightened, the edge 15' of the front wall 15 of the hook 14 comes to co-operate with the front wall 17 of the lug. In doing so, the set-forward central fraction 15A co-operates with the recess 17A of the V-shape of the front wall of the lug, and the hooking sides 15B and 15C co-operate with the branches 17B and 17C. This makes it possible to guide the hook during tightening so that it is centered relative to the lug even before it passes over said lug.

The V-shapes 19A, 19B, & 19C, and 17A, 17B, & 17C have blunt tips, respectively 19A and 17A. In this example, said tips form flats extending in a transverse orientation T. It would thus also be possible to define the shapes of said V-shapes as being U-shaped, with the branches, respectively 19B & 19C and 17B & 17C, diverging from the base 19A, 17A symmetrically about a midline that, in this example coincides with the axis L.

In FIG. 2A, it can be seen that, on the front side of the lug 18, the branches of the V-shape are connected to a front strip segment 16B corresponding to the first end 10A of the belt and situated substantially in the plane of said belt. Inclined ribs, respectively 21B and 21C, are situated on this connection. It can be seen that these ribs are disposed symmetrically about the longitudinal axis L of the strip segment in which the lug is formed. These ribs serve as ramps for making it easier for the edge 15' of the front wall 15 of the hook 14 to rise up over the lug 18. They are situated substantially half-way along the branches of the V-shapes, respectively 17B & 19B, and 17C & 19C.

In FIG. 2A, it can also be seen that the branches of the V-shape, be it the V-shape of the rear wall 19 of the lug or the V-shape of its front wall 17, are inclined at an angle α relative to the transverse direction T of the belt, this angle lying approximately in the range 10° to 45°, and preferably approximately in the range 15° to 30°. In addition, as indicated above, the tip 19A, 17A of the V-shape is flattened or rounded.

Figure 3:
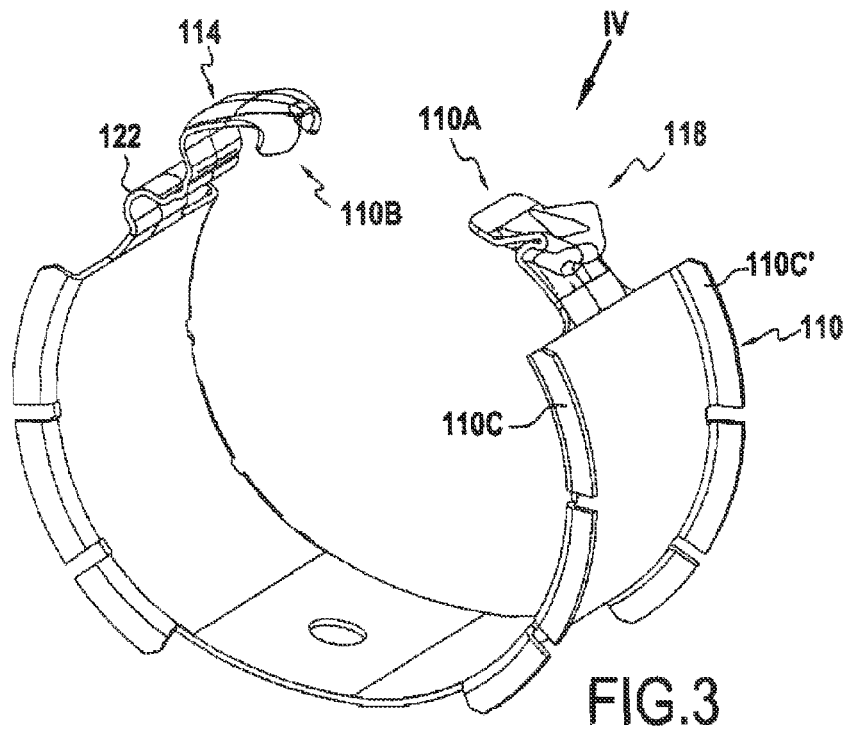
FIG. 3 is a perspective view from one side, showing another variant of a collar.

FIG. 3, which also shows a variant embodiment of a collar of the invention, is described below. This collar comprises a metal belt 110 that is formed from a single strip of metal. The lug 118 is formed at a first end 110A of the belt while the hook 114 is formed at a second end 110B of the belt. It can be seen that, behind the hook, the belt has an undulation 122 forming a reserve of elasticity. The lug is identical to the lug 18 that is described above with reference to FIGS. 1, 2A, and 2B. Conversely, as can be seen, in FIG. 4A, the hook 114 is slightly different from the hook 14 of the preceding figures. Its front wall has a central setback 115A, on either side of which two side fractions remain, respectively 115B and 115C. The side fractions are inclined in such a manner as to match the shaping of the branches of the V-shape that the lug forms, respectively 19B & 19C, and 17B & 17C. The ribs 21B and 21C are also clearly visible in FIG. 4A. While the hook 114 is being hooked over the lug 118, the edges of the side fractions 115B and 115C come to slide against the branches 17B and 17C of the V-shape of the front wall 17 of the lug, and more precisely they co-operate with the ribs 21B and 21C so as to guide the hook in such a manner as to center it relative to the lug, on the longitudinal axis L of the strip in which the belt is formed. After hooking, the side fractions 115B and 115C respectively fit over the branches 19B and 19C of the V-shape formed on the rear wall of the lug 118. At the same time, the tip 19A of the V-shape of the rear wall of the lug 118 comes to be received in the setback 115A in the front wall of the lug.

Figure 4A:
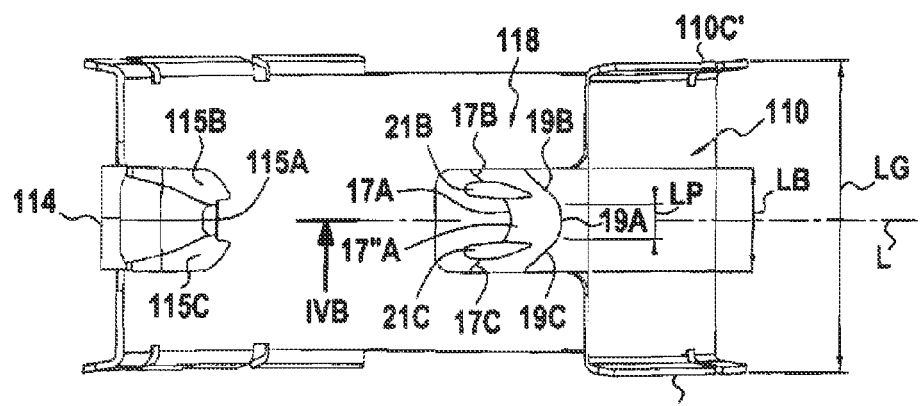
FIG. 4A is a plan view of the FIG. 3 collar, seen from above looking along arrow IV of FIG. 3.

It can be understood, in particular from FIG. 4A, that the collar that is shown is a collar of large width LG. However, in the region of the hooking members that are formed by the hook and by the lug, said width is reduced to a width LB. As in FIG. 2A, the tip 19A of the V-shape of the rear wall of the lug 118 extends over a width LP that is approximately in the range ¼ of the width LB of the strip fraction that carries it to ⅓ of said with LB. Said width LB is locally smaller than the width LG of the belt and covers about ⅓ of said width, while being centered on the longitudinal axis L of the strip in which the belt is formed.

It can also be seen in FIGS. 3 and 4A that the edges of the belt have upstanding margins 110C and 110C'. These upstanding margins are split radially at regular intervals so as to avoid opposing tightening of the collar. They make it possible to impart an impact-protection function to this wide collar. In addition, these upstanding margins prevent the longitudinal edges from forming sharp edges, and thereby limit the potential of said longitudinal edges to cause damage to the article clamped by the collar, in particular when said article is made of rubber or the like, or, in general, of any material other than metal.

Figure 4B:
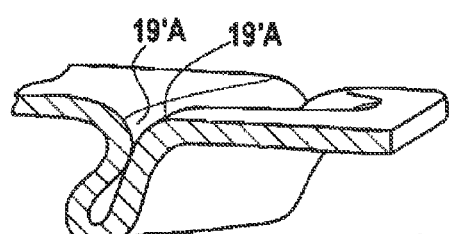
FIG. 4B is a fragmentary view in section on line IVB of FIG. 4A.

FIGS. 4B, 6, and 7, which show the inside face of the lug, are described below. Under the lug 118, it is possible to see, in particular, the recess 19'A that, on the outside face of the lug, corresponds to the tip 19A of the V-shape. It can be seen in FIGS. 4B and 6 that a central fraction 17'A of the base of the front portion of the double fold forming the lug 18 is pushed away, in the plane of the belt, under said front portion, in the recess 19'A. This can also be seen in FIG. 4A, in which it can be seen that the base of the recess 17A of the V-shape of the front wall of the lug has been pushed away at 17"A in such a manner that, between the ribs 21B and 21C, it extends under the top of the lug 18.

It can be seen in FIG. 7 that the width. LR of the pushed-away central fraction 17'A lies in the range ¼ of the width of the lug to ⅓ of said width of the lug, which width corresponds, in this example, to the width LB of the strip fraction in which the lug formed.

The invention claimed is:

1. A clamping collar comprising a metal belt having a projecting lug in the vicinity of a first end, and a hook in the vicinity of a second end, which hook has a front wall designed to be retained against a rear wall of the lug while the hook is hooked onto the lug in order to maintain the collar in the tightened state, wherein, seen from above, the rear wall of the lug has a V-shape having a tip pointing away from the hook, and the front wall of the hook has hooking sides that are inclined relative to a transverse direction of the belt to match an inclination of the branches of the V-shape,
   wherein the lug is formed by a double fold, and wherein, seen from above, the front portion of the double fold, which portion forms the front wall of the lug, also has a V-shape having a tip pointing away from the hook.

2. A collar according to claim 1, wherein the branches of the V-shape of the rear wall of the lug are inclined at an angle lying in the range 10° to 45° relative to the transverse direction of the belt.

3. A collar according to claim 2, wherein the branches of the V-shape of the rear wall of the lug are inclined at an angle lying in the range 15° to 30° relative to the transverse direction of the belt.

4. A collar according to claim 1, wherein the tip of the V-shape of the rear wall of the lug is flattened or rounded.

5. A collar according to claim 1, wherein the branches of the V-shape of the front wall of the lug are inclined at an angle lying in the range 10° to 45° relative to the transverse direction of the belt.

6. A collar according to claim 5, wherein the tip of the V-shape of the front wall of the lug is flattened or rounded.

7. A collar according to claim 5, wherein the branches of the V-shape of the front wall of the lug are inclined at an angle lying in the range 15° to 30° relative to the transverse direction of the belt.

8. A collar according to claim 1, wherein, in the recess of the V-shape of the front portion of the lug, a central fraction of the base of the front portion of the double fold that forms the lug is pushed away in the plane of the belt, under said front portion.

9. A collar according to claim 8 wherein the width of said pushed-away central fraction lies in the range ¼ of the width of the lug to ⅓ of said width of the lug.

10. A collar according to claim 1, wherein, on the front side of the lug, the branches of the V-shape of the front portion of the lug are connected to a front strip segment that is situated substantially in the plane of the belt, via inclined ribs.

11. A collar according to claim 1, wherein the front wall of the hook is provided with a central setback.

12. A collar according to claim 1, wherein the front wall of the hook has a central fraction that is set forward going from the head of the hook towards the set-forward edge of said central fraction, and two side fractions that are set back relative to said central fraction.

13. A collar according to claim 1, wherein the front wall of the hook has a central fraction that is set forward going from the head of the hook towards the set-forward edge of said central fraction, and two side fractions that are set back relative to said central fraction.

* * * * *